United States Patent [19]

Borchsenius

[11] 3,839,706

[45] Oct. 1, 1974

[54] INPUT/OUTPUT CHANNEL RELOCATION STORAGE PROTECT MECHANISM

[75] Inventor: Erik Borchsenius, Hopewell Junction, N.Y.

[73] Assignee: International Business Machines Corporation, Armonk, N.Y.

[22] Filed: July 2, 1973

[21] Appl. No.: 376,078

[52] U.S. Cl. .................................... 340/172.5
[51] Int. Cl. .................................... G06f 3/00, G06f 13/00
[58] Field of Search .................................... 340/172.5

[56] References Cited

UNITED STATES PATENTS

| | | | |
|---|---|---|---|
| 3,573,736 | 4/1971 | Schiaeppi | 340/172.5 |
| 3,675,209 | 7/1972 | Trost et al. | 340/172.5 |
| 3,704,453 | 11/1972 | Blackwell et al. | 340/172.5 |
| 3,706,077 | 12/1972 | Mori et al. | 340/172.5 |
| 3,725,864 | 4/1973 | Clark | 340/172.5 |

*Primary Examiner*—Gareth D. Shaw
*Assistant Examiner*—James D. Thomas
*Attorney, Agent, or Firm*—Owen L. Lamb

[57] ABSTRACT

An input/output data channel operates in conjunction with a virtual memory computer. A channel operation is commenced with the execution of a start I/O instruction which transfers a channel address word (CAW) to the channel. The CAW contains a virtual command address pointing to the beginning of a virtual channel program. The virtual command address is presented to a channel look-aside buffer which translates the virtual command to a real memory address for accessing main storage. The virtual channel command words (CCW's) which comprise the channel program are successively translated by the channel look-aside buffer. A virtual address stack within the buffer holds active virtual data addresses and command addresses for each channel. Interlocking between this stack and a CPU translation mechanism is provided by an I/O bit array. The I/O bit array contains a count mechanism for each memory frame which may be addressed by the channel. Each time a memory frame is addressed by any of the channels, the corresponding count is incremented. Similarly, when any of the channels are through with the memory frame, the count is decremented. Thus, so long as there is an outstanding access to the memory frame, there is a non-zero count in the corresponding count position. The non-zero condition is transmitted to a CPU storage protect area to insure that the CPU does not try to use the same memory frame that the channel is accessing.

12 Claims, 17 Drawing Figures

FIG. 1
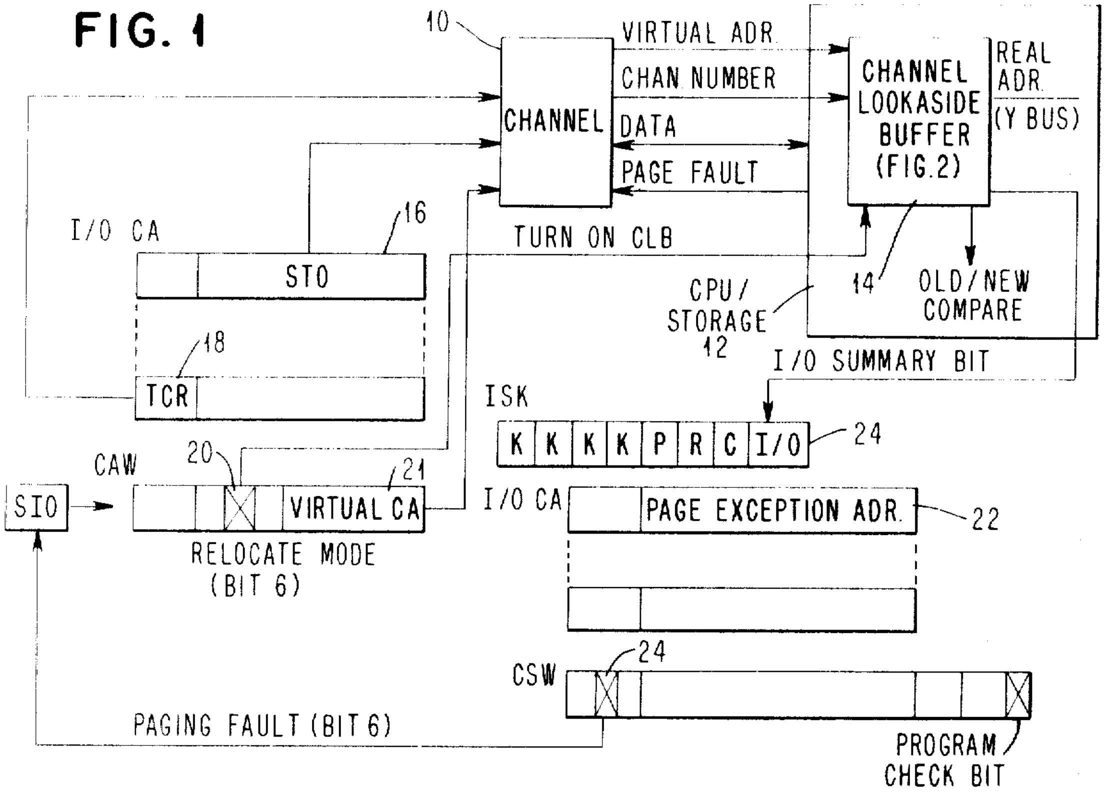
FIG. 2 CHANNEL LOOKASIDE BUFFER-14
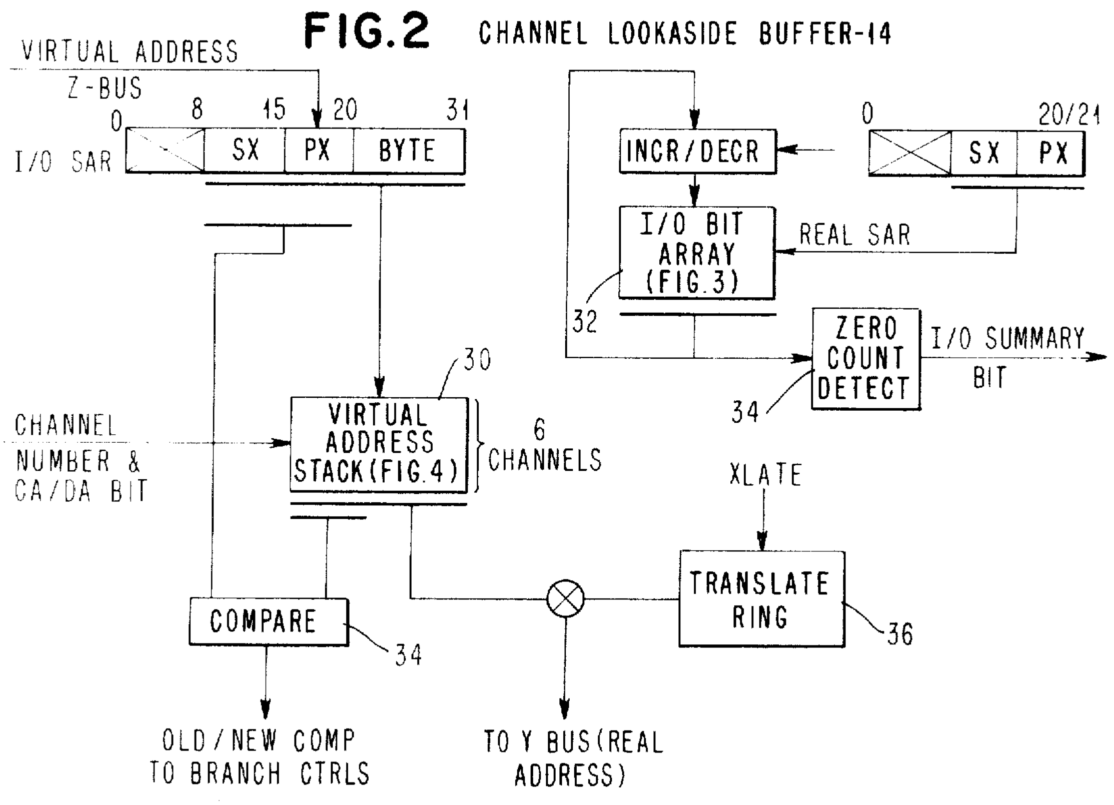

FIG. 16 I/O SUPERVISOR/SUBCHANNEL INTERLOCKING

CXIT TRANSLATE

INPUT/OUTPUT CHANNEL RELOCATION STORAGE PROTECT MECHANISM

BACKGROUND OF THE INVENTION

1. Field of the Invention

The invention relates to data processing systems, and more specifically to a means of translating input/output channel programs in a virtual memory or paging environment.

Co-pending patent application Ser. No. 211,913, filed Dec. 27, 1971, entitled "Channel Program Translation" by L. E. Larson and co-pending patent application Ser. No. 274,771, filed July 24, 1972, entitled "Virtual Memory System" by J. L. Burk, et al., describe, respectively, a programmed controlled method of address translation in the control program and a hardware translator for translating virtual addresses to real addresses by using a segment storage origin address and segment and page addresses to reference segment tables and page tables in main memory.

Relocation is a technique by which instructions are permitted to be executed in an area of main storage for which they were not written. This technique permits the creation of a virtual storage which appears to the programmer to have a capacity which is only limited by the length of the address field in the instruction and not by the number of places in main storage. This creation of a virtual storage allows several computer programs to be executed either by a single central processing unit or by a number of processing units which share the same memory. The time sharing of programs requires a total storage capacity which is larger than the capacity of the actual main storage. Program relocation allows each program to run as if it had access to the entire storage and the operation of the other programs is transparent to that program.

The present invention is concerned with the relocation of channel programs. Channel programs are comprised of a series of channel command words (CCW's). CCW's are instructions which are fetched by channels and are executed by a channel to control the flow of data between input/output devices and main storage.

In the past, channel relocation was desirable but could not be implemented in hardware and therefore a programming system such as that described in the above-identified Larson patent application was devised. In that system, command addresses and data addresses are translated by a program operating in the computer and by the use of an indirect data address list which is referenced by the CCW. That is, if a CCW string crosses page boundaries, an indirect address list is constructed for the CCW. The indirect list provides a series of beginning addresses for a discontinuous string of data storage. This list is referenced by an indirect address stored in the translated CCW. A flag is turned on in the CCW to indicate to the channel executing the channel program that the indirect address list is to be referenced.

In order to provide a hardware translator for the channel certain problems had to be solved. For example, communication is required between the channels and the CPU so that channels desiring to use a particular area of memory will not interfere with the CPU. Furthermore, when an I/O page fault occurs, there must be a way of recovering from this so that the channel can continue.

Therefore, it is a primary object of this invention to provide a channel program relocation mechanism which permits the channels to operate in a paged or virtual memory environment. It is a further object of this invention to provide a communication mechanism between a relocating channel and a relocating CPU to facilitate the I/O page interlocking function so that subchannels are able to lock and unlock the real storage frames associated with their data and command addresses.

It is a further object of this invention to provide an apparatus by which a channel control word string in a virtual memory is translated to real storage addresses as the channel program is executed by the channel.

It is a further object of this invention to provide a hardware mechanism for mapping virtual storage areas associated with an input/output channel program into a non-continguous set of pages in real storage.

A further object of this invention is to provide a hardware means in the channel for translating virtual addresses to real addresses which is compatible with the input/output supervisor for translating addresses.

The above objects are accomplished in accordance with the invention by providing a dynamic address translation mechanism which is available to the input/output channel. An input/output summary bit is generated and placed in the storage key to provide input/output page interlocking with the CPU. By using this, subchannels lock and unlock the real storage frames associated with their respective data and command addresses. Whenever a memory location within the frame is accessed by any of the subchannels, a counter in an I/O bit array associated with that frame is incremented. Whenever a subchannel is through using that area within the frame, the counter is decremented. A zero detector indicates via the I/O summary bit that the count is zero and hence, the frame is available or unlocked for use by the CPU. Channel paging faults result in a channel program check which, by means of the channel status word and the interrupt mechanism, causes the control program to make the requested page available and restart the channel program by means of reissuing the start I/O command.

In accordance with an aspect of the invention, data addresses are translated after the command out tag is generated to reduce the risk of command overrun.

The invention has the advantage that by use of the I/O summary bit, pages can be locked and unlocked and a number of subchannels can be handled.

Furthermore, program to subchannel communication is made possible by using the I/O summary bit.

The invention has the advantage that the programming support for a channel designed in accordance with the present invention is required to do no pretesting for page faults thus reducing considerably the amount of programming overhead.

The invention has the further advantage of providing a storage protection mechanism wherein the subchannels carry their own segment table origins and strogae protect keys which is an improvement over the prior art channel program supervisor which has no hardware protection among subchannels since all channel programs operate under the same key.

The invention has the further advantage that it increases throughout by reducing the amount of instruction required to translate channel programs as is done in the prior art.

The invention has the further advantage that it is independent of the indirect data address list type of channel.

The invention has the further advantage that the apparatus is compatible with the CPU relocation mechanism and eliminates the need to purge the channel table look-aside buffer.

DESCRIPTION OF THE DRAWINGS

The foregoing and other objects, features and advantages of the invention will be apparent from the following detailed description of a preferred embodiment of the invention as illustrated in the accompanying drawings wherein:

FIG. 1 is an overal block diagram of computer system which has been modified to practice the present invention;

FIG. 2 in a block diagram of the channel look-aside buffer portion of FIG. 1;

DESCRIPTION

Introduction

Figure 3:
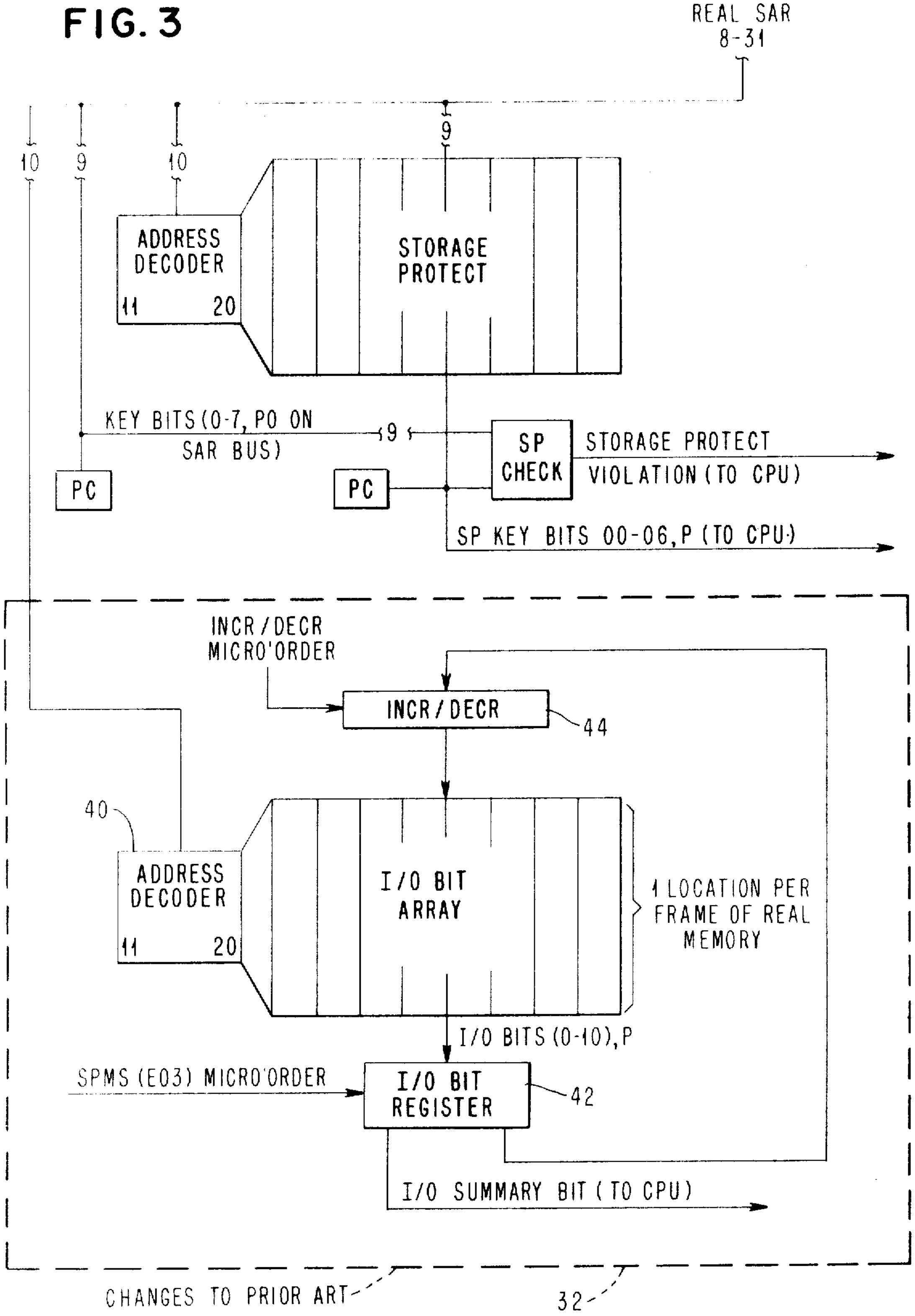
FIG. 3 is a block diagram of the I/O bit array of FIG. 2.

The following terms are used in this specification:

Address Translation: The process of changing the address of an item of data or an instruction from its virtual address to its real storage address.

Basic Control (BC) Mode: A mode in which the features of a System/360 computing system and additional System/370 features, such as new machine instructions, are operational on a System/370 computing system.

Dynamic Address Translation (DAT): The change of a virtual storage address to a real storage address during execution of an instruction.

Frame: A 2K or 4K real section of memory.

Extended Control (EC) Mode: A mode in which all the features of a System/370 computing system, including dynamic address translation, are operational.

Page: A fixed-length (2K or 4K virtual section of memory) block of instructions, data, or both, that can be transferred between real storage and external page storage.

Paging: Transferring instructions, data, or both, between real storage and external page storage.

Page Table: A table that indicates whether a page is in real storage, and correlates virtual addresses with real storage addresses.

Real Address: The address of a location in real storage.

Segment: A continuous 64K area of virtual storage, which is allocated to a job or system task.

Segment Table: A table used in dynamic address translation to control user access to virtual storage segments. Each entry indicates the length, location, and availability of a corresponding page table.

Virtual Address: An address that refers to virtual storage and must, therefore, be translated into a real storage address when it is used.

Relocation is a technique by which instructions are permitted to be executed in an area of main storage for which they were not written. This technique permits the creation of a virtual storage which appears to the programmer to have a capacity which is only limited by the length of the address field in the instruction and not by the number of places in main storage.

A virtual storage is divided into segments, each of which is divided into pages with each page consisting of a predetermined number of bytes. By fragmenting programs into page segments, main storage can be allocated in paged increments. Therefore, pages can be located randomly throughout main storage and swapped in and out of main storage as pages are needed. Random location of pages necessitates the construction of page tables that reflect the actual or real location of each page. Thus a single page table reflects the real locations of all pages of a particular segment. Other page tables reflect the real location of the pages associated with the other segments of the virtual storage.

Random location of the page tables necessitates the construction of a segment table that reflects the actual or real location of the page table. The segment table and the page tables for a user are maintained in main storage and are utilized in translating a user's virtual address into a real address, i.e., an actual location in main storage, of the required page.

Address translation is the process of converting the virtual address into actual or real main storage addresses. Such a system of relocation is described in the above-identified Burk et al. patent application. Briefly, a 24 bit virtual address is divided into three fields: a segment field (SX) which occupies bits 8 – 15; a page field (PX) which occupies bits 16 – 20; and a byte field which occupies bits 21 – 31. The virtual storage consists of 256 segments, with each segment consisting of up to 32 pages and each page consisting of up to 2,048 bytes.

The segment field serves as an index to an entry in the segment table. The segment table entry contains a value which represents the base address of the page table associated with the segment table designated by the segment field. The page field serves as an index to an entry in the page table. The page table entry contains a value which represents the actual or real address of the page. The byte field undergoes no change during translation and is concatenated with the translated page address to form the actual or real main storage address which is presented to the main storage address register for memory reference.

The translation process is a two level look-up procedure involving segment and page tables from main storage. The segment address portion (SX) of the virtual address is added to a segment table origin (STO) address stored in a control register in order to obtain a segment table entry from the segment table. The segment table entry contains a page table origin (PTO) address which is added to the page address portion (PX) of the virtual address to provide the address of a page table entry within the page table. The page table entry contains a real address which is combined with the byte portion of the virtual address to form the real address of a byte of data. To avoid repeating this translation process for every storage reference, a directory is maintained and updated to contain virtual and real page addresses of recently referenced pages. At the beginning of a translation, the virtual page address under translation is checked against the directory to see if the real address is already available. If it is, the directory provides a real page address thereby avoiding the translation described above.

General Description of Channel Relocation

The above described address translation with respect to the CPU program. The present invention is concerned with the relocation of channel programs and will be described with respect to the IBM System/370 Model 155 II Data Processing System which has in it the dynamic address translation facility which enables the system to use virtual addresses and to operate in a paged environment as described above. The following description referes to the above system as described in IBM Maintenance Library Manual System/370 Mod 155 II, (TO/DM) Theory of Operation/Diagram Manual, Form No. ZZ22—6916—0, IBM System/370 Mod 155II Dynamic Address Translation Facility, Form No. GA22—7017—0, IBM System/370 Principles of Operation, Form No. GA22—7000—0 and IBM System/360 Interface - Channel to Control Unit, Form No. A22—6843—3, copies of which may be obtained by contacting any IBM branch office.

Referring now to FIG. 1, the data processing system in which the invention is embodied is illustrated. The system has been modified to practice the present invention by the addition of a channel lookaside buffer (block 14) and various control lines and control bits which will now be described. A channel 10 is connected to a CPU and storage 12. A channel look-aside buffer 14 is provided in accordance with the present invention to provide for translating virtual addresses presented by the channel into real addresses for referencing the storage. The communication between the hardware and the software is accomplished by means of an I/O control area (IOCA) which holds control information which is needed by the channel to support the dynamic address translation function. This control information comprises a segment table origin word (STO) 16, translation control bits (TCR) 18 and a relocate mode bit 20 which is part of the channel address work (CAW) which is more fully described in the above referenced System/370 Principles of Operation.

During the presentation of primary status, all subchannels will pass to the IOCA and the channel status word (CSW) all the required translation information needed by the control program to support paging faults and translation exceptions. This comprises a page exception address 22 and a paging fault bit 24 which is bit 6 of the CSW.

An additional bit is required in the insert storage key (ISK). This bit is called the IO bit 24 and performs the function of locking and unlocking pages used by the channel program.

A channel operation is commenced with the execution of a start I/O instruction (SIO) which transfers a channel address word (CAW) to the channel 10. The CAW contains a virtual command address 21 pointing to the beginning of a virtual channel program. The virtual command address is presented to a channel look-aside buffer 14 which translates the virtual command to a real memory address for accessing main storage. The virtual channel command words (CCW's) which comprise the channel program are successively translated by the channel look-aside buffer 14.

Referring to FIG. 2, the channel look-aside buffer is comprised of a virtual address stack 30 and an I/O bit array 32. The virtual address stack holds the active virtual data address and command address for each of six channels. The corresponding real addresses are stored in Unit Control Words (UCW) for each of six channels. The I/O bit array 32 provides interlocking between this stack and the CPU relocate mechanism. The I/O bit array contains a count for each of the memory frames which may be addressed by the channel. Each time a memory frame is addressed by any one of the channels, the corresponding count is incremented. Similarly, when any one of the channels are through with the memory frame, the count is decremented. Thus, so long as there is an outstanding request for access to the memory frame, there is a non-zero count in the corresponding count position. The value of the count will depend upon how many channels have accessed that memory frame. A zero count detector 34 detects a zero count and generates an I/O summary bit (24 of FIG. 1) which is transmitted to the insert storage key (ISK) in the storage protect area of memory.

As described on page 132 of the referenced TO/DM manual, the Model 155II uses the standard System/360/370 storage protection scheme. Four additional bits — a reference bit (R), a change bit (C), an I/O summary bit (I/O), and a parity bit (P), are appended to each storage protection key to accommodate reference, change, and I/O usage recording.

A protection exception occurs when the access to main storage is denied on the basis of the storage protection keys.

The reference and change bits are used by the supervisor program in the algorithm for dynamic paging. The reference, change, and I/O bits throughout the storage protection array are polled periodically by the supervisor program and their status is used to determine the frames in main storage that are candidates for paging activity.

Each time a fetch occurs, the reference bit associated with the corresponding frame area is turned on. During store operations, the reference, change, and parity bits are all turned on. Any I/O reference turns on the I/O summary bit to thus provide interlocking between the channels and the memory area.

The insert and set storage key instructions are modified to accommodate the eight bit key. When in EC mode, the complete eight bit key is inserted into the designated register; in BC mode, only five bits are inserted. Reference, change and I/O recording, however, are active in either mode.

A virtual address and a channel number are presented to the channel look-aside buffer of FIG. 2. The channel number, along with a command/data address indicator, selects one of twelve channel registers in the stack 30. The segment address (SX) and the page address (PX) are compared with the corresponding segment and page addresses of the selected channel in the stack 30 by means of a compare circuit 34. If the old and new addresses compare, it is not necessary to go through an address translation as this address has already been translated. A translate counter 36 is provided which is stepped by a translate micro-order to gate various portions of the selected register 30 to the CPU y-input latch (adder input). If the address has already been translated then this counter is used to transfer the real address to the y-input latch and eventually to the storage address register. If the address needs to be translated, then the virtual address is transferred to the CPU y-input latch, the translation takes place in the CPU adder, and the real address is returned and stored in the active UCW via the z-bus adder output.

Detail Description

This description makes reference to the above-identified System/360 Model 155II, Theory of Operation/Diagram Manual (TO/DM).

The special main storage operations (SPMS) register in the buffer control unit (BCU) has two additional positions defined for controlling the I/O array. Bit 12 is "read I/O array" and bit 14 is "reset I/O array." When the bit is set, the operation described is performed. The read I/O array operation causes the contents of the I/O bit array to be set into the array sense latches where it is parity checked (PC). The reset I/O array causes the contents to be set to zero.

Refer to FIG. 3, which is a modification of Diagram 5-200 of the above-referenced Model 155II TO/DM. The real storage address register (SAR) contents are decoded in an address decoder 40 to select one of the memory frames. The SPMS (EO3) micro-order is extended to include I/O array resets and fetches in conjunction with the two extra bits defined above:

SPMS (EO3) (Emit = CX) — Read the I/O bit array addressed by adder output Z bus bits (12–19);

SPMS (EO3) (Emit = BX) — Reset the I/O bit array addressed by adder output Z bus buts (12–19).

Accordingly, the I/O bit register 42 will contain the contents of the addressed portion of the I/O bit array upon the execution of the micro-order. The I/O summary bit line to the CPU is positive if the I/O bit register contents addressed are not zero.

The output of the I/O bit register is fed through the increment/decrement logic 44 which is controlled by the increment/decrement micro-order. The function of the increment/decrement micro-order is to increment or decrement the I/O bit array addressed by the Z bus:

INCR/DECR (Emit 7 = 0) — Increase by one the value of the I/O bit array addressed by Z bus bits (12–19);

INCR/DECR (Emit 7 = 1) — Decrease by one the value of the I/O bit array addressed by Z bus bits (12–19).

The above described micro-orders provide for the generation of the I/O summary bit by maintaining in the I/O bit array a count of the number of I/O references made to the addressed memory frame. By way of example, suppose that channel 1 references a page corresponding to a particular frame. The increment/decrement micro-order would cause the I/O bit array contents corresponding to that memory frame to be increased by one. Suppose that channel 2 referenced the same page. The increment/decrement micro-order would increase the contents of the I/O bit array for that memory frame by one and it would now read 2. This process continues for as many channels (and consequently, subchannels) as may reference that same memory page. When channel 1 is through with the page it referenced, the increment/decrement micro-order would decrease by one the value of the I/O bit array contents corresponding to the memory frame. Thus, the count would be reduced to one and the I/O summary bit would remain on thus allowing channel number 2 to continue locking that particular memory frame.

Figure 4:
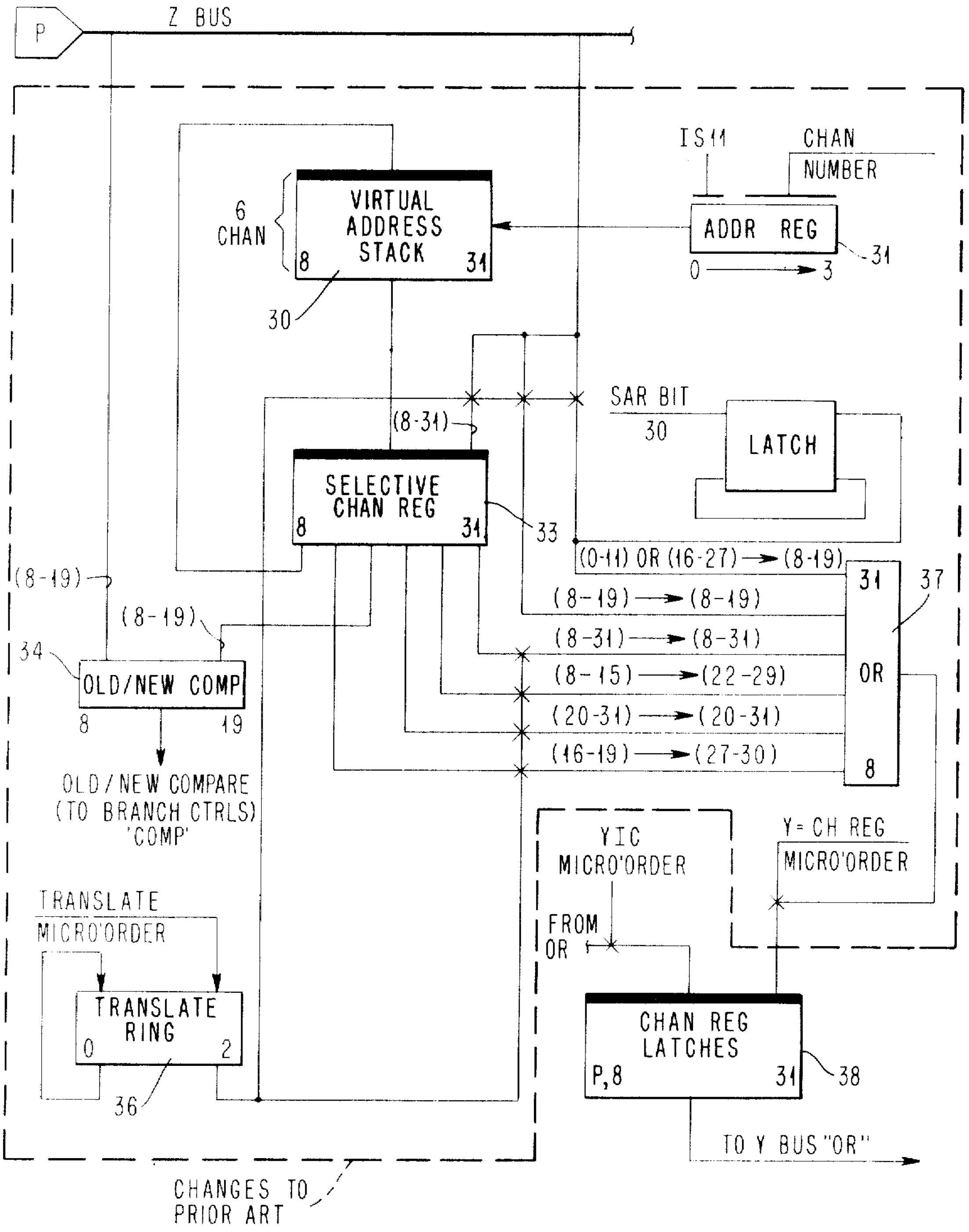
FIG. 4 is a block diagram of the necessary additional registers in the channel to perform relocation.

Referring now to FIG. 4, the channel data flow, diagram 6-200 of the above referenced manual, has been modified in accordance with the present invention by attaching to the Z bus the logic enclosed by dotted lines. The virtual address stack 30 has 12 areas, two for each channel, to hold the active virtual data address (DA) (its real counterpart is held in UCW storage) and the active virtual command address (CA) (its real counterpart is held in UCW storage) for each channel. The contents of the stack are selected by an address register 31 which decodes the channel number obtained from the channel and a DA/CA bit which indicates either the data address or command address portion.

The output of the virtual address stack drives a selective channel register 33 which is used to provide ingating to the Y input latches for translation purposes and is also used to compare the old and new virtual addresses obtained from the Z bus. In the case of a compare, translation is not required because the real address has already been obtained.

A compare/branch micro-order is defined to compare the selective channel register with the contents of the Z bus:

COMP = 1 — If Z bus bits (8–19) equal selective channel register bits (8–19);

COMP = 0 — If otherwise.

A translate micro-order (XLATE) is defined to step the counter 36 which through appropriate gating gates various parts of selective channel register 30 to OR circuit 37 which places the contents in the channel register latches 38. The output of channel register latches 38 is gated to the y bus input to the CPU adder for performing various translation functions. The counter 36 is stepped each time the translate micro-order is issued. The Y bus input gating is defined as follows:

| | |
|---|---|
| XLATE 0 | NOP |
| XLATE 1<br>(Fetch) | Y (0-7) = 0<br>Y (8-31) = Sel CH Reg (8-31) |
| XLATE 2<br>(4 × Seg) | Y (0-21) = 0<br>Y (22-29) = Sel Ch Reg (8-15)<br>Y (30-31) = 0 |
| XLATE 3<br>(Set) | Sel Ch Reg = Z (8-31) |
| XLATE 4<br>(Real LS Mix) | Y (0-7) = 0<br>Y (8-19) = Z (8-19)<br>Y (20-31) = Sel Ch Reg (20-31) |
| XLATE 5 | Reserved |
| XLATE 6<br>(2 × Pg) | Y (0-26) = 0<br>Y (27-30) = Sel Ch Reg (16-19)<br>Y (31) = 0 |
| XLATE 7<br>(Real SDR Mix) | Y (0-7) = 0<br>Y (8-19) = Z (0-11) if bit 30 LATCH = 0<br>Y (8-19) = Z (16-27) if bit 30 LATCH = 1<br>Y (20-31) = Sel Ch Reg (20-31) |

Start I/O (SIO) Operation

FIGS. 5 - 14 correspond to diagram 6-400, parts 1 through 7 of the above-identified Theory of Operation/Diagram manual. The changes to the prior art manual are illustrated by dotted lines on the figures of the drawings.

Figure 5:
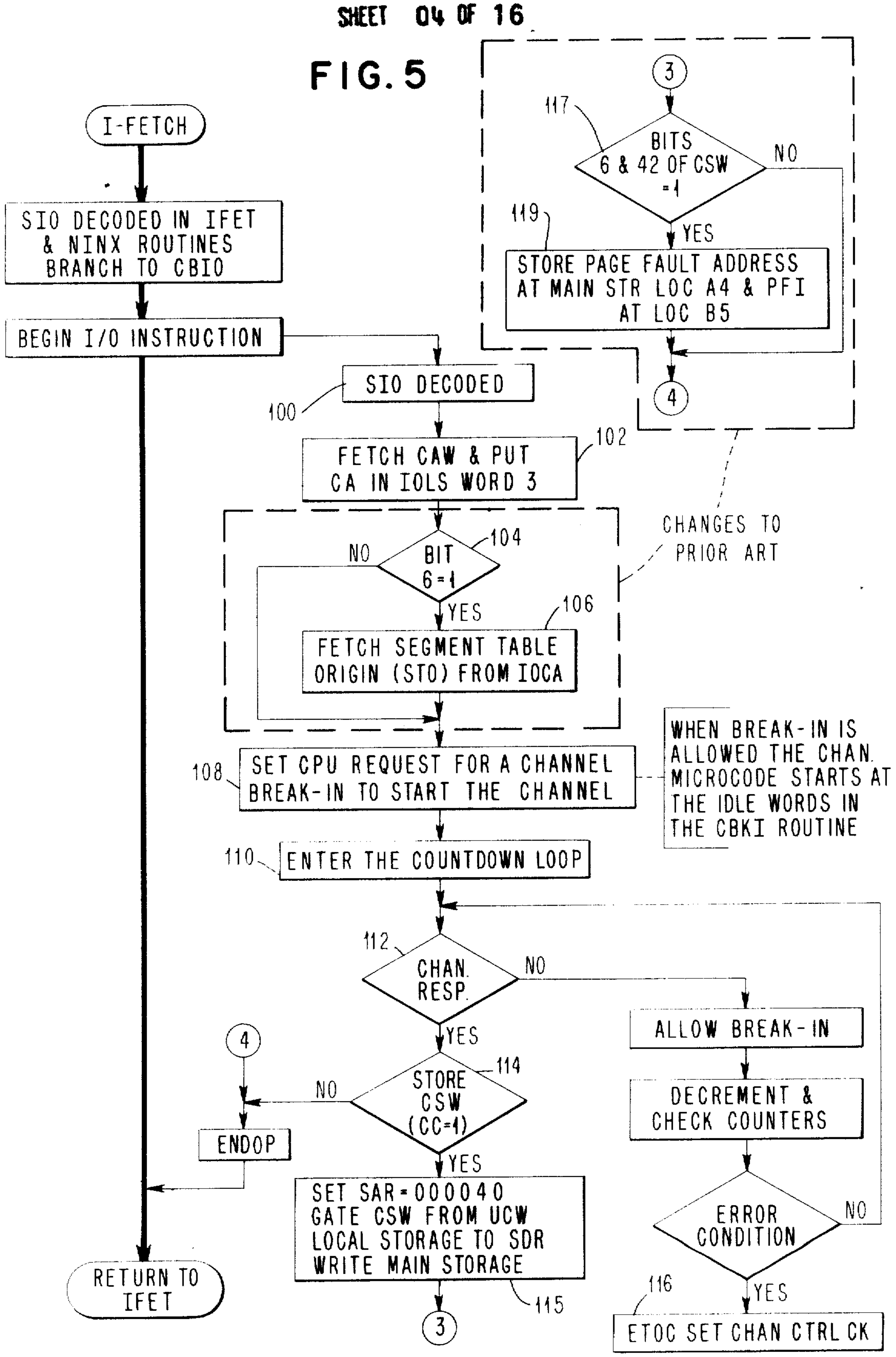
FIG. 5 is a flowchart of the hardware and microcode necessary to perform a start I/O operation showing the fetching of the segment table origin.

Referring to FIG. 5, after an instruction I fetch, a start I/O (SIO) is decoded 100 and the CPU fetches the command address word (CAW) 102 and places the command address in the I/O local store word number 3. If the CAW bit 6 is equal to 1 at decision 104, this indicates relocate mode to the CPU which fetches the segment table origin (STO) from the I/O control area (IOCA) logic block 106.

The CPU initiates a CPU request for break-in for the channel microcode 108 and enters the count down loop 110 until the channel signals a response 112. If a response is not received within the count down time limits, a channel control check error 116 occurs.

Assuming a channel response, if there is no need to store the channel status word (CSW) decision 114, the operation is ended and the flow returns to the instruction fetch.

If status is to be stored, the CSW is gated from the unit control word (UCW) to the storage data register (SDR), block 115. If bit 6 is on, a paging fault has occurred, and this plus a program check bit 42 causes a yes from decision block 117. The channel then stores the page fault address and turns on the page fault indicator (PFI), block 119.

Figure 6:
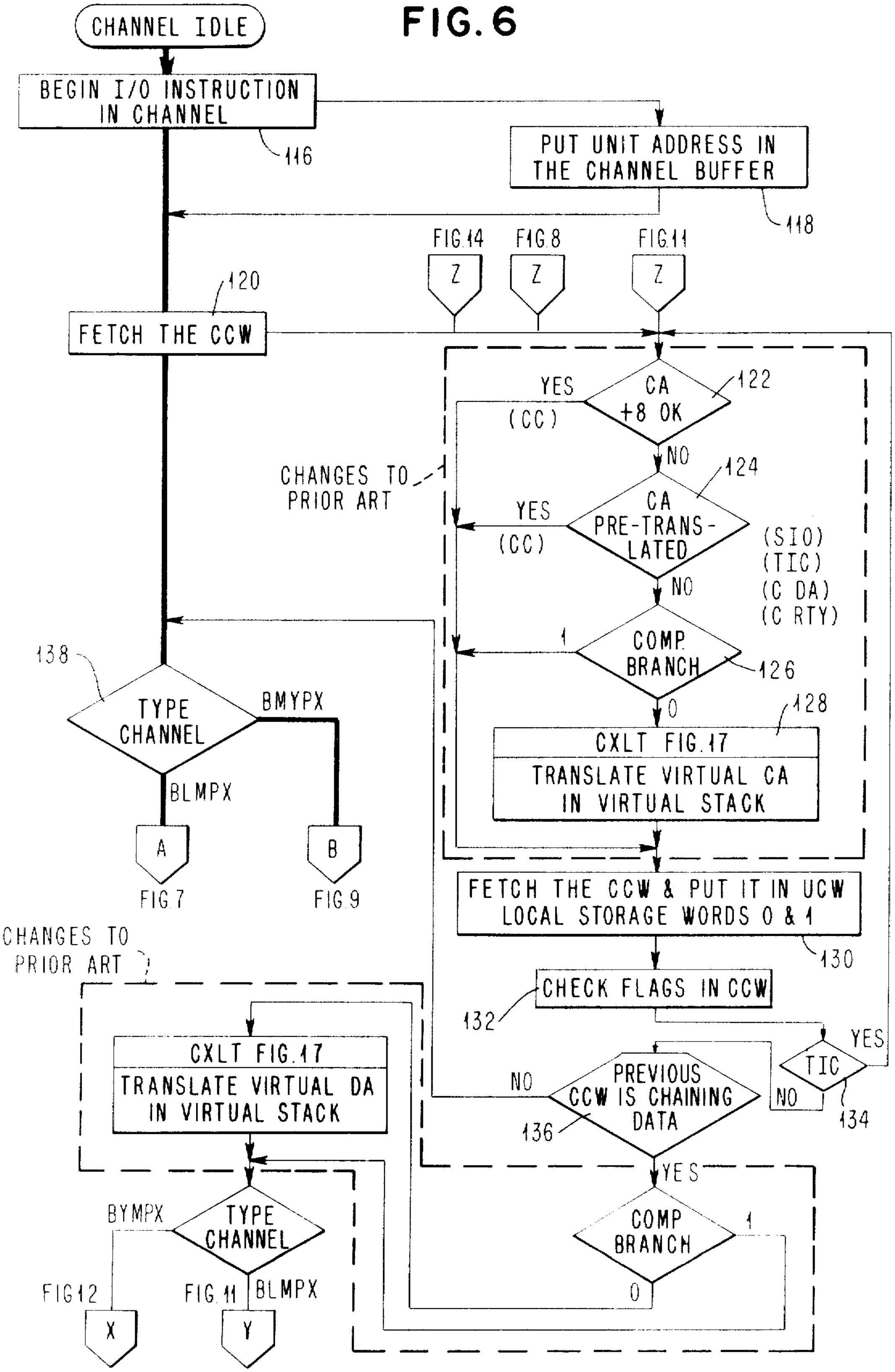
FIG. 6 is a continuation of the start I/O operation showing translation of the virtual command address and the data address in the virtual stack.

The channel operation begins on FIG. 6. The I/O instruction is begun at block 116 and the unit address from the start I/O instruction is placed in the appropriate channel buffer (block 118). Next, the channel translates the command address obtained from the CAW and uses the resulting real address to fetch the channel command word (CCW).

Since this is a start I/O operation, the command address plus 8 decision 122 results in a no and since no addresses have been pretranslated, the pretranslated control bit is off and decision 124 results in a no. Similarly the result of the compare branch 126 is 0 and it is necessary to translate the virtual command address in the virtual stack (block 128).

Figure 17:
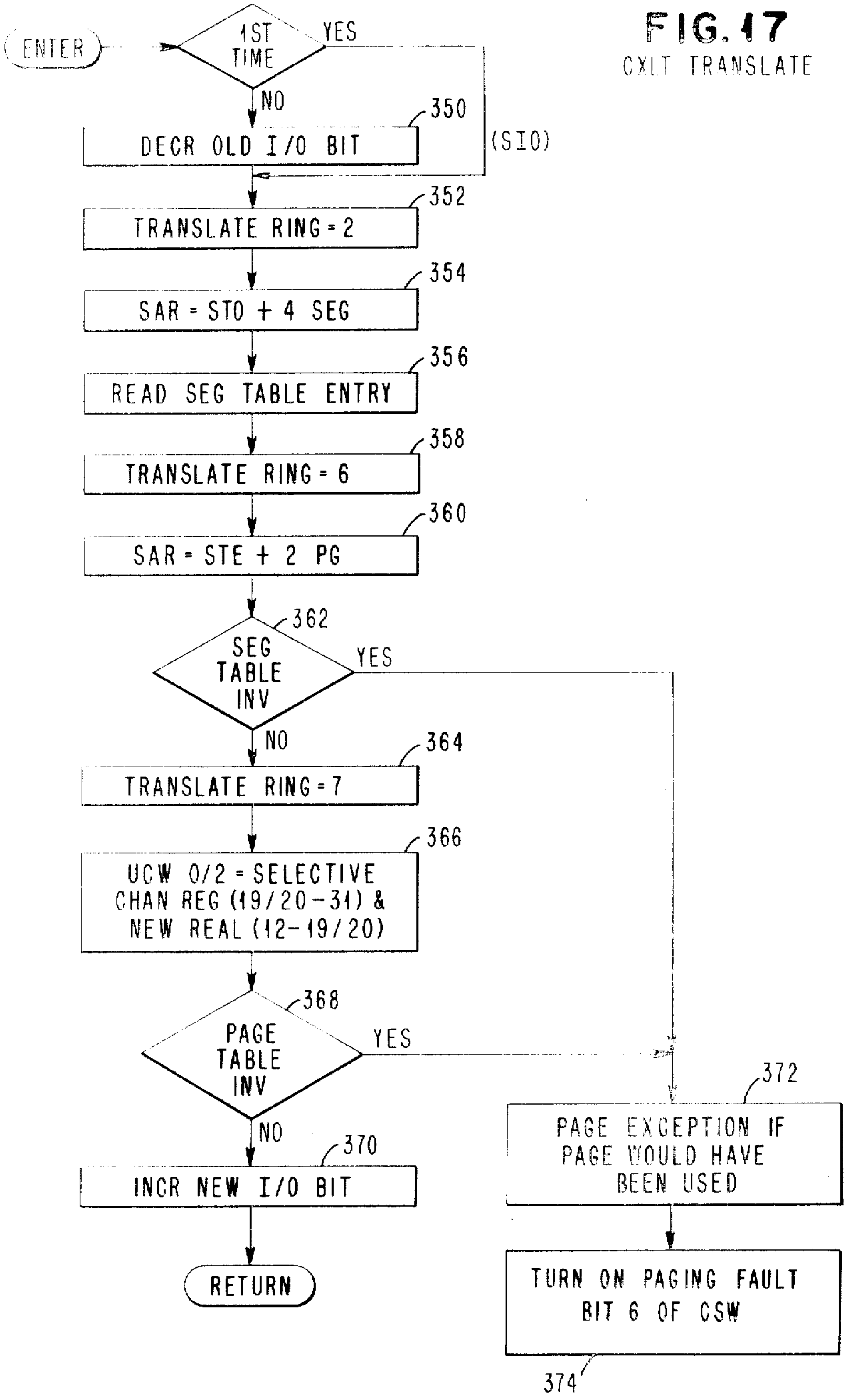
FIG. 17 is a flow diagram of the translate micro order.

Referring to FIG. 17, the CXLT function is described. The first step 350 (except in the case of a SIO) is to decrement the old I/O bit count in the I/O bit array. This reduces the I/O bit count by one and may turn off the I/O summary bit if no other subchannels are using this particular block location.

The translate ring 36 (FIG. 4) is next stepped to position 2 at block 352 FIG. 17. This causes the segment (SX) bits 8-15 to be gated through OR circuit 37 of FIG. 4 to the Y bus input to the adder where it is added to the segment table origin (STO) now held in the UCW 16 (FIG. 1) block 354 of FIG. 17. Next at block 356, the segment table entry is read thus providing the page table origin (PTO) address block 356. Next at block 358, the translate ring is stepped to 6 which, referring again to FIG. 4, gates the SAR page (PX) bits 16-19 to the adder where it is added to the segment table entry (STE) resulting in the page address from the page table. If the segment table invalid decision 362 is yes, a page exception occurs block 372. If no, the translate ring is 9 stepped to 7 block 364. This causes the concatenation of the byte portion of the selective channel registers and the page table entry from main storage to be stored in the unit control word location indicated in block 366. If the page table is invalid, an exception occurs block 368. If not, the new I/O bit count in the I/O array is incremented to reflect the current usage of this memory frame by the channel. The flow returns to FIG. 6.

The CCW is placed in the unit control word (UCW) local storage block 130 and the flags in the CCW are checked block 132. If a transfer-in-channel command is indicated block 134, the flow returns to the translation function. If no, a test is made to see if the previous CCW is chaining data block 136. Since this is a start I/O command, the result is no and a test is made at block 138 to determine the type of channel. For a block multiplex channel, the flow continues at FIG 7. For a byte multiplex channel, the flow continues at FIG. 9.

Initial Selection — Block Multiplex Channel

I/O interface sequences are described fully in the above referenced interface manual.

Figure 7:
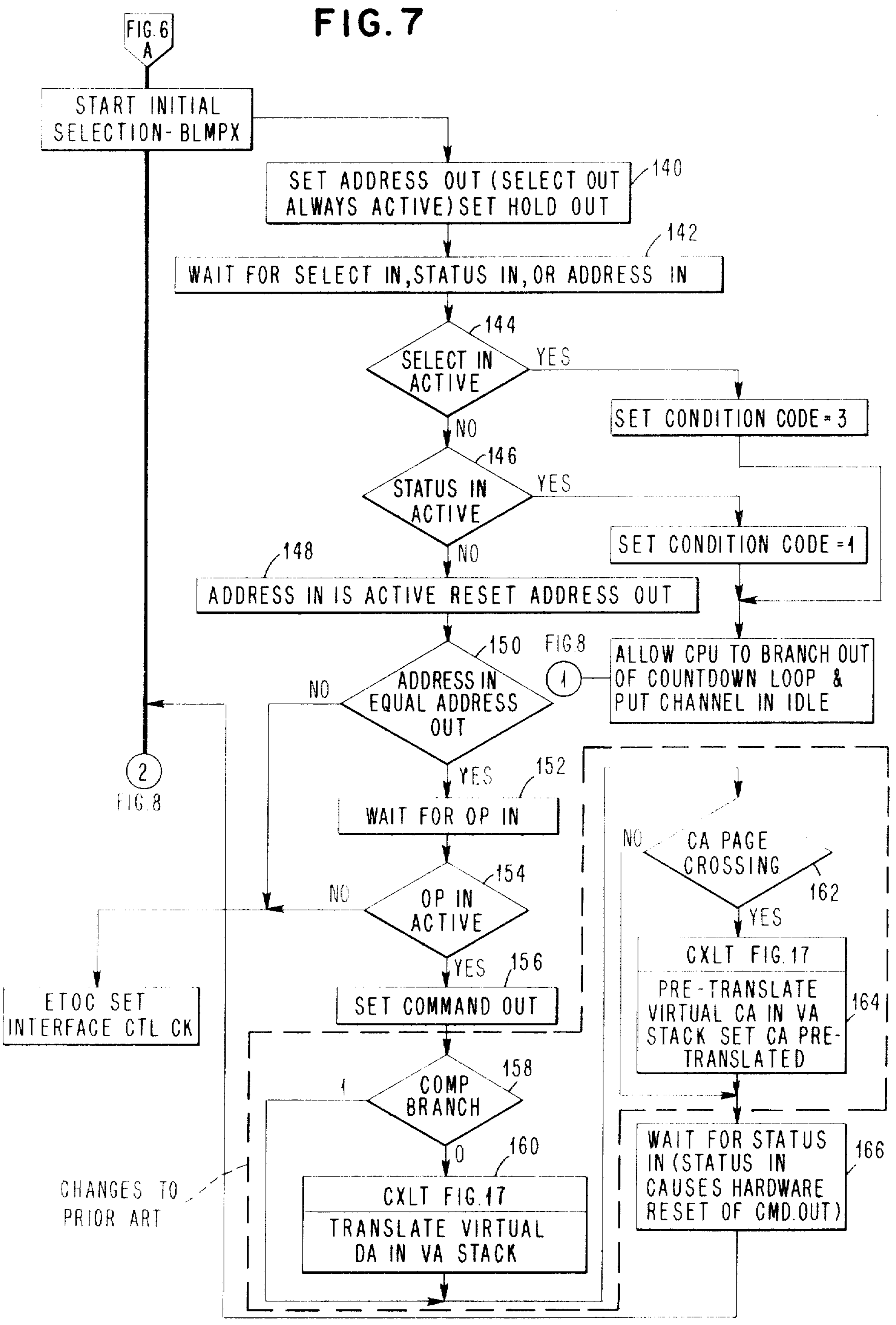
FIG. 7 is a continuation of the I/O operation showing the mechanism for handling the command address page crossing.

Referring to FIG. 7, select out is active to the I/O control unit and address out and hold out are raised by the channel 140. The channel waits for the control unit to raise select in, status in or address in in response to address out, 142. Assuming select in is not raised 144 and status in is not raised 146, the control unit responds with address in 148 and the channel drops address out. If the address on bus in is equal to the address placed on bus out by the channel 150, then the correct control unit has been selected and the channel waits for operational in from the control unit 152. When operational in is active 154, the channel turns on command out 156. A compare is made of the virtual data address with the data address stored in the stack 130 (FIG. 4) at the compare branch decision 158. A compare is made at this point while the channel is waiting for status in to reduce the chance of command overrun.

If the result of the compare branch 158 is zero, the translation of the data address is necessary and is performed in block 160. If the command address crosses a page boundary block 162, the command address in the virtual address stack is pretranslated and the command address pretranslated control bit is turned on block 164. Next the channel waits for status in from the control unit which will cause the channel to drop command out block 166.

Figure 8:
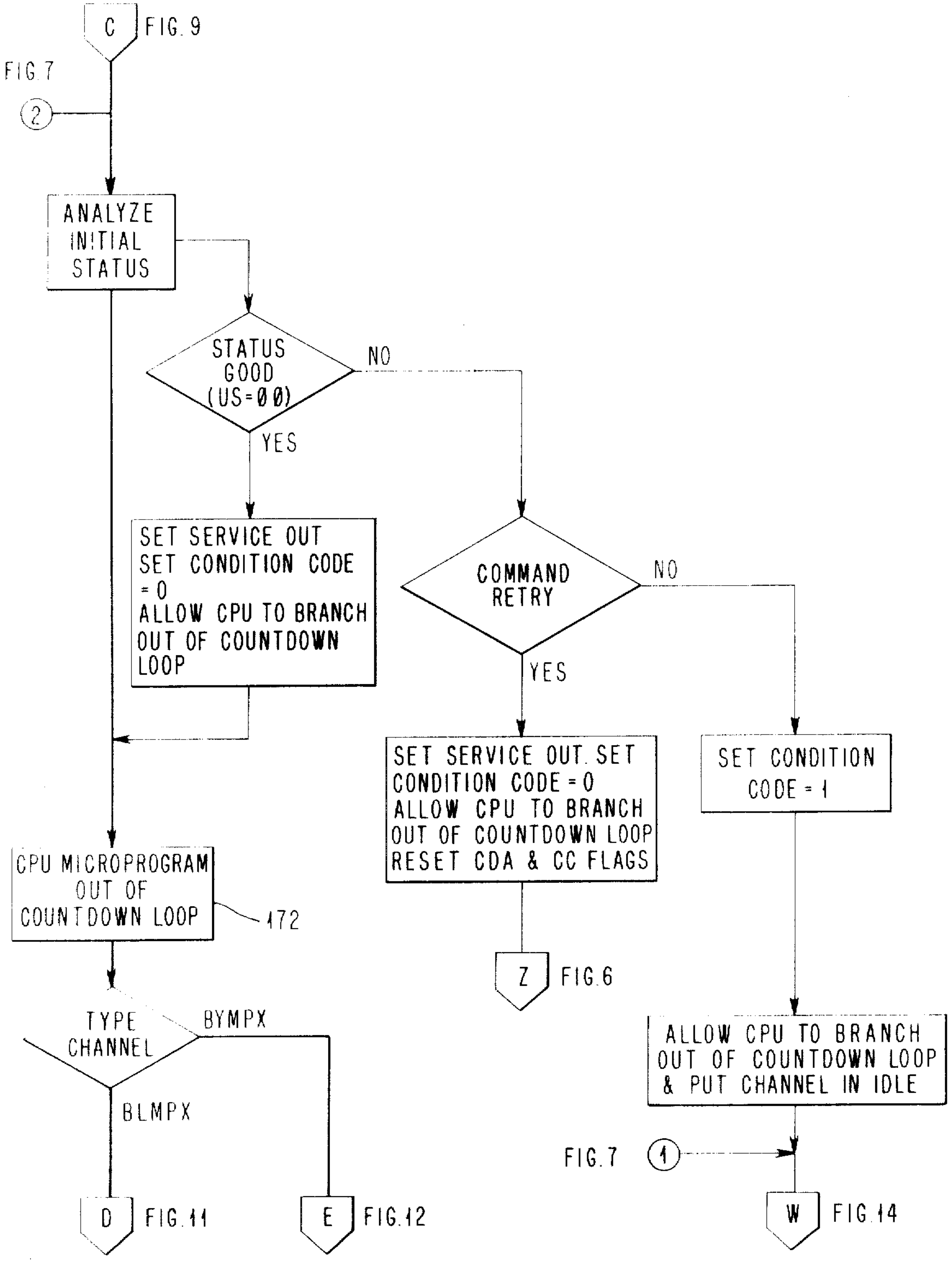
FIG. 8 is a continuation of the flow diagram showing the analysis of initial status.

The flow continues on FIG. 8 where initial status from the control unit is examined by the channel and if good status is found, then service out is raised and the CPU is allowed to branch out of the count down loop block 170.

Figure 11:
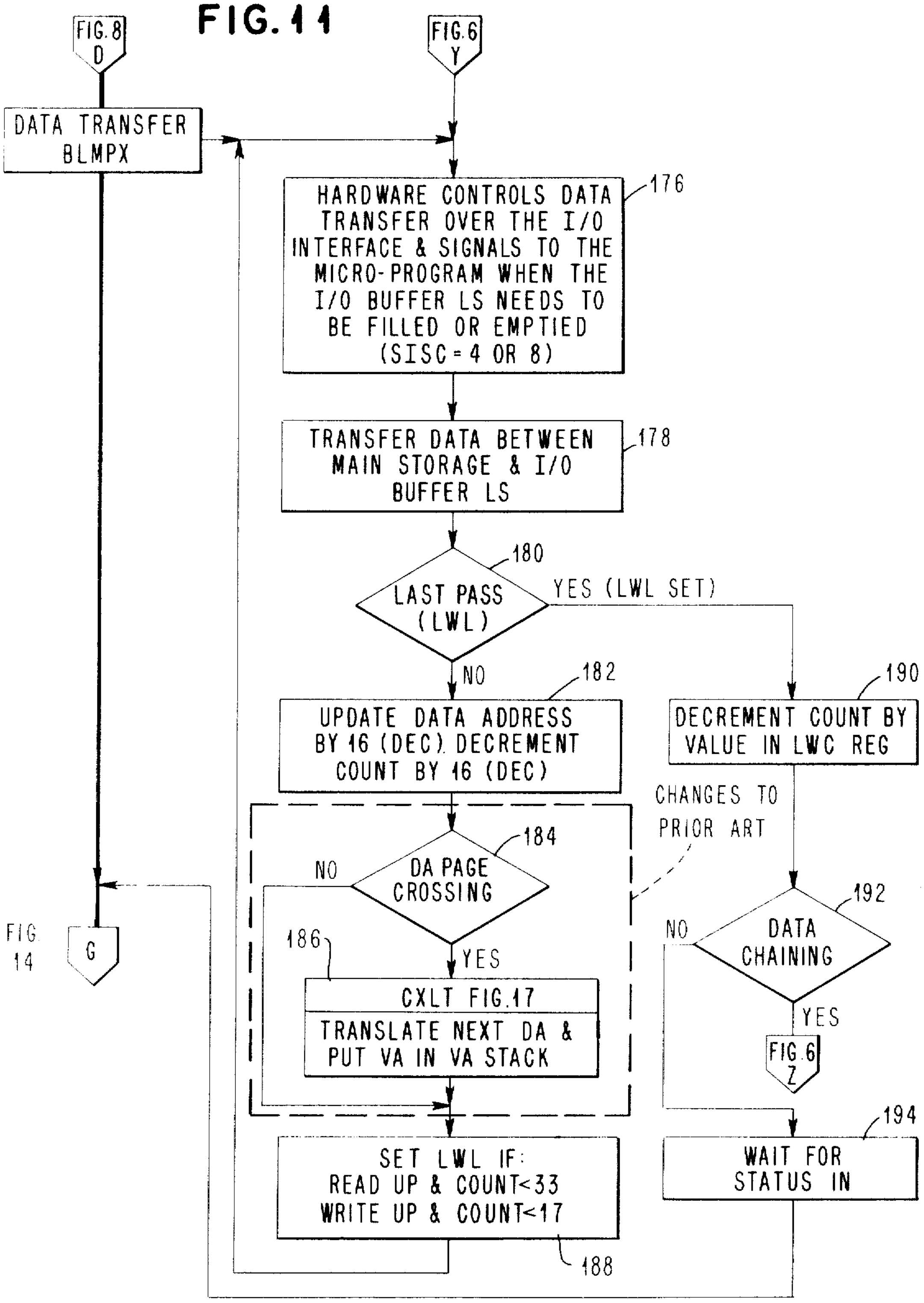
FIG. 11 is a flow diagram of the operation of a block multiplex channel.
Figure 12:
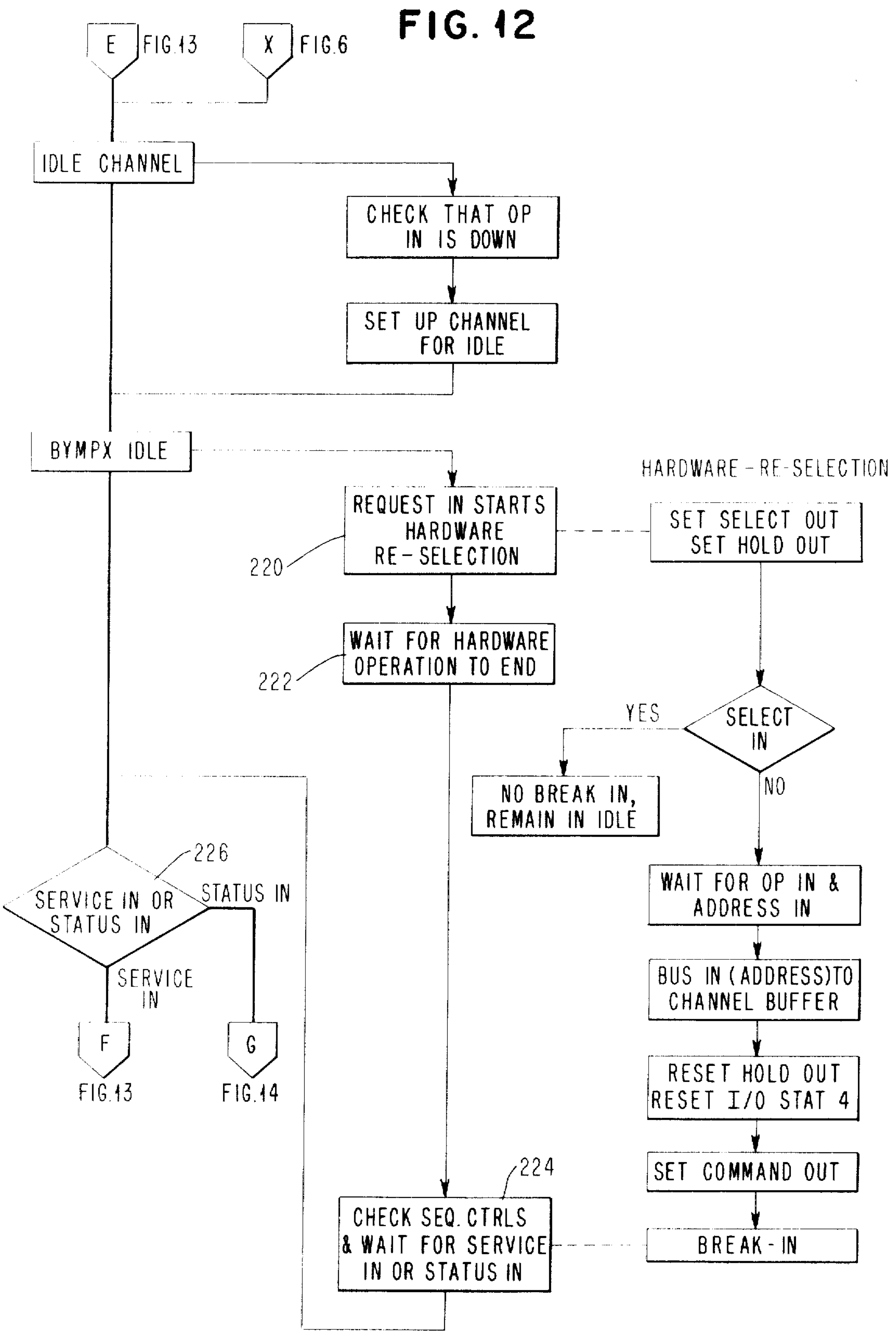
FIG. 12 is a continuation of the flow diagram for a byte multiplex channel.

The CPU microprogram branches out of the count down loop 172 and depending on the type of channel 174, the flow continues on FIG. 11 or FIG. 12.

Data Transfer — Block Multiplex Channel

Referring to FIG. 11, the hardware controls data transfer over the I/O interface block 176 and signals to the microprogram control when the I/O buffer local store needs to be filled or emptied. Data is transferred (block 178) between main store and the I/O buffer local store.

The last word latch (LWL) is not set block 180. The flow proceeds by decrementing the data address and the word count block 182. A test is made at block 184 to see if the data address crosses a page boundary. If yes, a translation is necessary and the next data address is translated and put into the virtual address stack. If no, translation is not necessary and the flow continues to block 188. At block 188 the last word latch is set if a count of 33 is reached on a read operation or a count of 17 is reached on a write operation. The flow continues at the top of the page and if the last pass decision 180 is yes, the count is decremented block 190 and if data chaining is indicated block 192, the flow returns to FIG. 6. If no data chaining is indicated, the channel waits for status in from the control unit block 194 and the flow continues to FIG. 14 end operation.

End Operation

Figure 14:
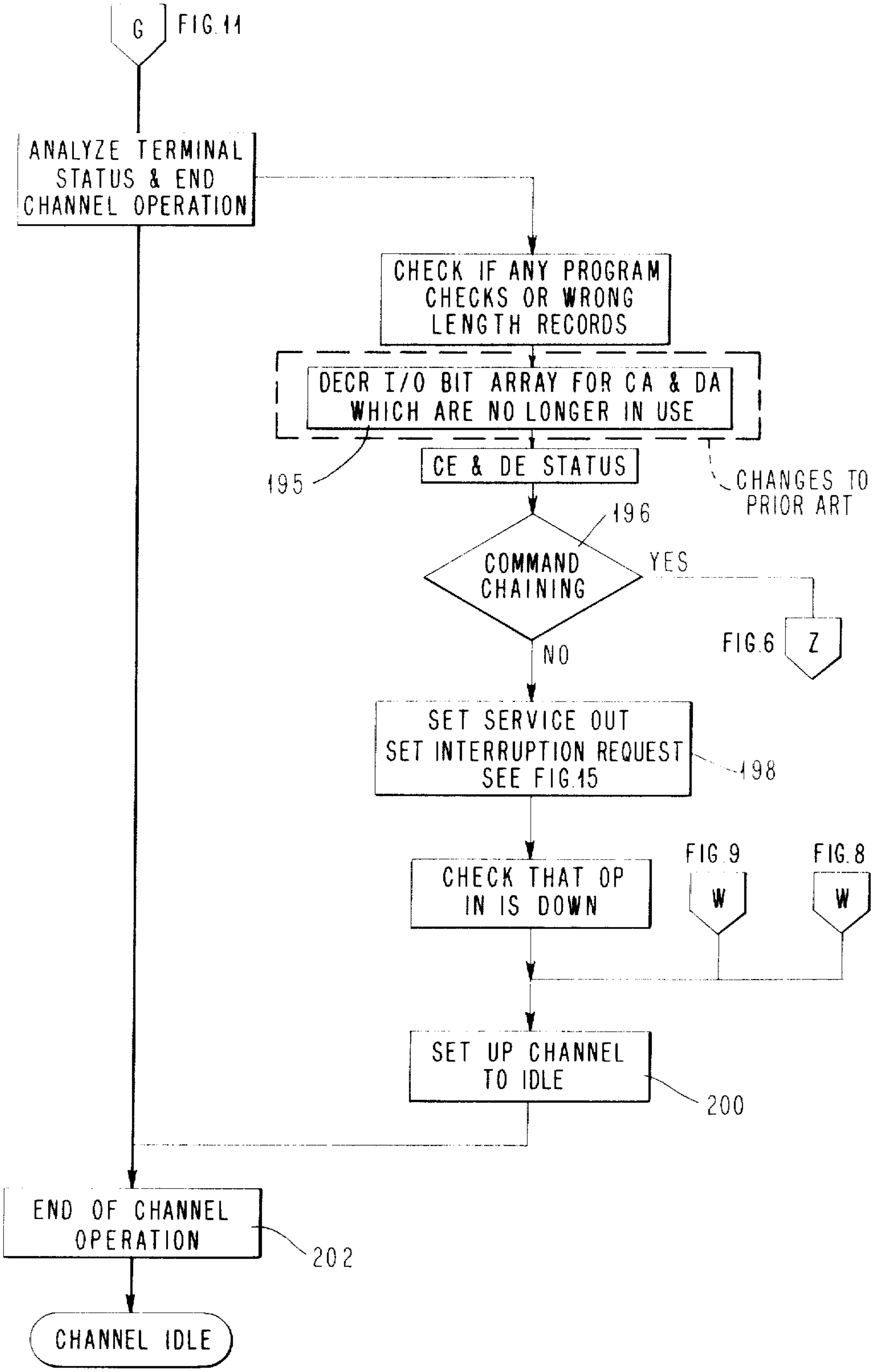
FIG. 14 is a continuation of the operation flow diagram showing the end of a channel operation.

Referring to FIG. 14, an end of operation occurs at the end of the channel program when data chaining is no longer indicated. The I/O bit array is decremented for the subchannels whose command address and data address are no longer in use, block 195. If command chaining is indicated block 196 of FIG. 14, the flow returns to FIG. 6. If command chaining is not indicated, then the end channel operation continues by setting an interruption request 198 and setting up the channel to idle 200 resulting in an end of channel operation 202.

Initial Selection Sequence - Byte Multiplex Channel

Figure 9:
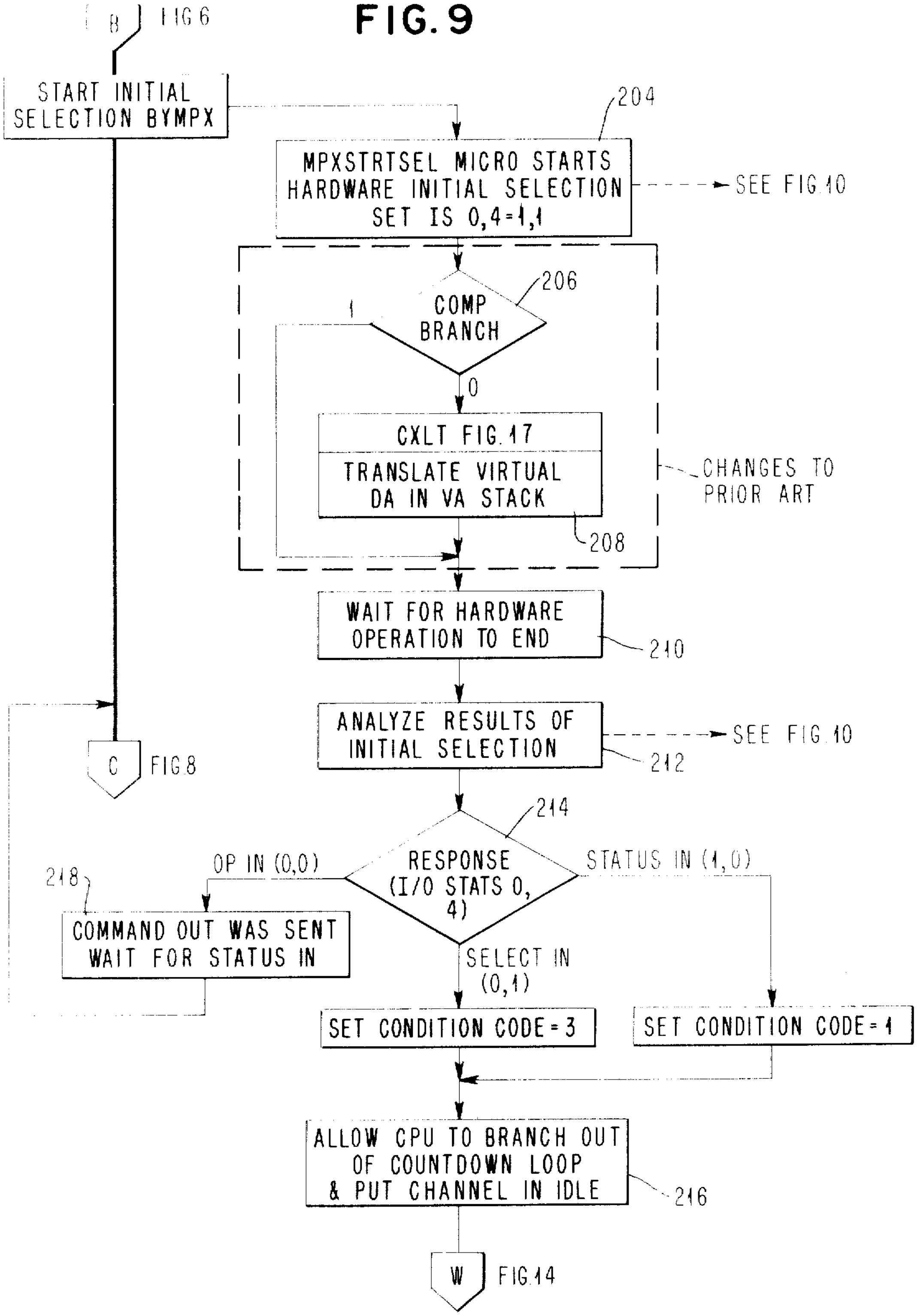
FIG. 9 is a continuation of the flow diagram for a byte multiplex channel.
Figure 10:
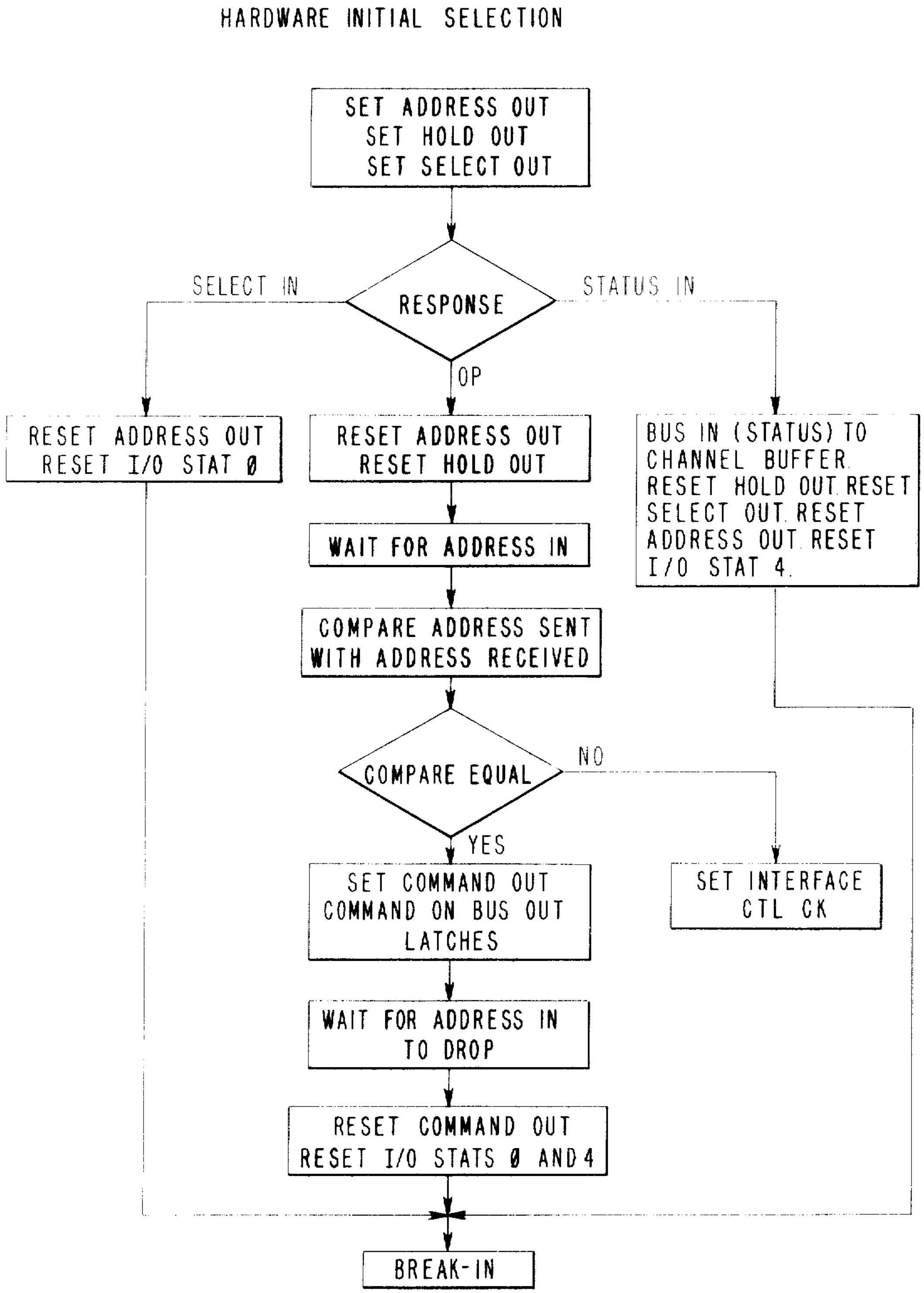
FIG. 10 is a block diagram of the hardware initial selection.

Referring to FIG. 9, the channel microcode starts the hardware initial selection operation block 204 which performs the initial selection sequence shown in FIG. 10. In parallel with the hardware operation, the microcode causes a compare branch micro-order to be performed block 206. If the virtual data address has not already been translated, the compare branch output is zero and a translation function 208 is performed. At block 210 the microcode waits for the hardware operation of FIG. 10 to conclude. The results of the initial selection are analyzed block 212. One of three paths is taken depending upon which response was received during the initial selection (decision block 214). If status in was received or select in was received, the appropriate condition code is set and the CPU branches out of the count down loop and puts the channel in idle block 216 and the flow proceeds to the ending operation of FIG. 14. Assuming that operational in was returned and a device was selected, then the channel waits for status in block 218 and the flow continues on FIG. 8.

At FIG. 8, initial status is analyzed as previously described and since this is a byte multiplex channel, (block 174) the flow proceeds to FIG. 12.

Referring to FIG. 12, an idle byte multiplex channel is put into operation in response to request in rising from the control unit which causes a hardware reselection block 220. The hardware reselection is an interface operation to re-connect the control unit/device to the channel, as more fully described in U.S. Pat. No. 3,336,582, W. F. beausoleil, et al Interlocked Communication System, issued June 1, 1971. When the hardware operation is ended block 222, the channel waits for service in or status in block 224.

If status in is received block 226, the flow continues to the ending operation FIG. 14. If service in is received, then the flow continues on FIG. 13, data transfer.

Data Transfer — Byte Multiplex Channel

Figure 13:
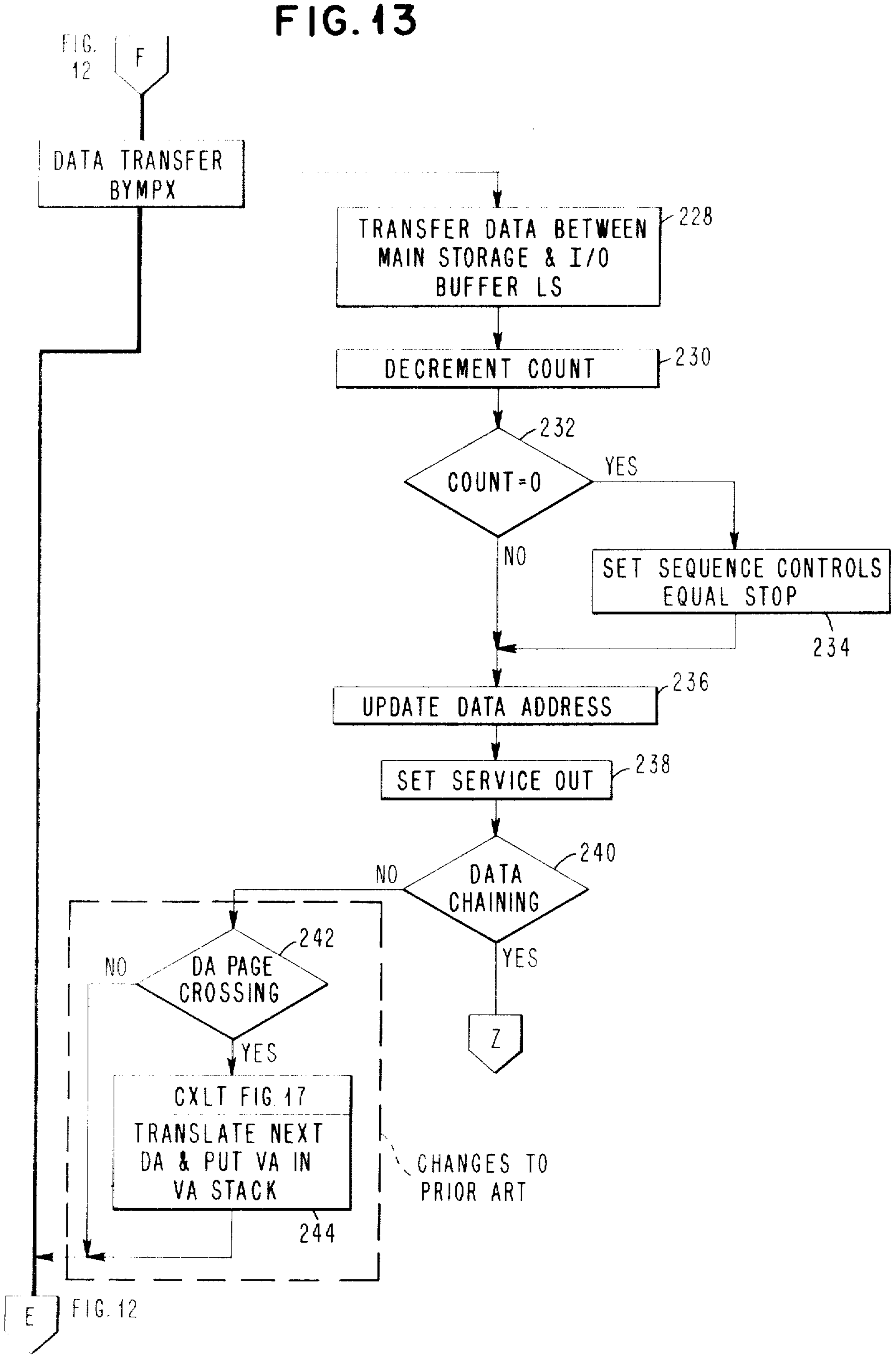
FIG. 13 is a flow diagram showing the data transfer operation of a byte multiplex channel including the translation function when the data address crosses a page.

Referring to FIG. 13, data transfer is initiated by request in rising from the control unit. Data transfer occurs between main storage and the I/O buffer local store block 228 and the count is decremented block 230 until the count is equal to zero 232. When this occurs, the sequence controls are set equal to stop block 234 and the data address is incremented block 236. The channel raises service out 238 and if data chaining is indicated at decision block 240, the flow returns to FIG. 6. If data chaining is not indicated, then a test is made to see if the data address crosses a page boundary block 242. If yes, the next data address is translated and the virtual address is put in the virtual stack at block 244. The flow then returns to FIG. 12 and the operation continues until an end of operation is called for.

Channel Interruption Request

Figure 15:
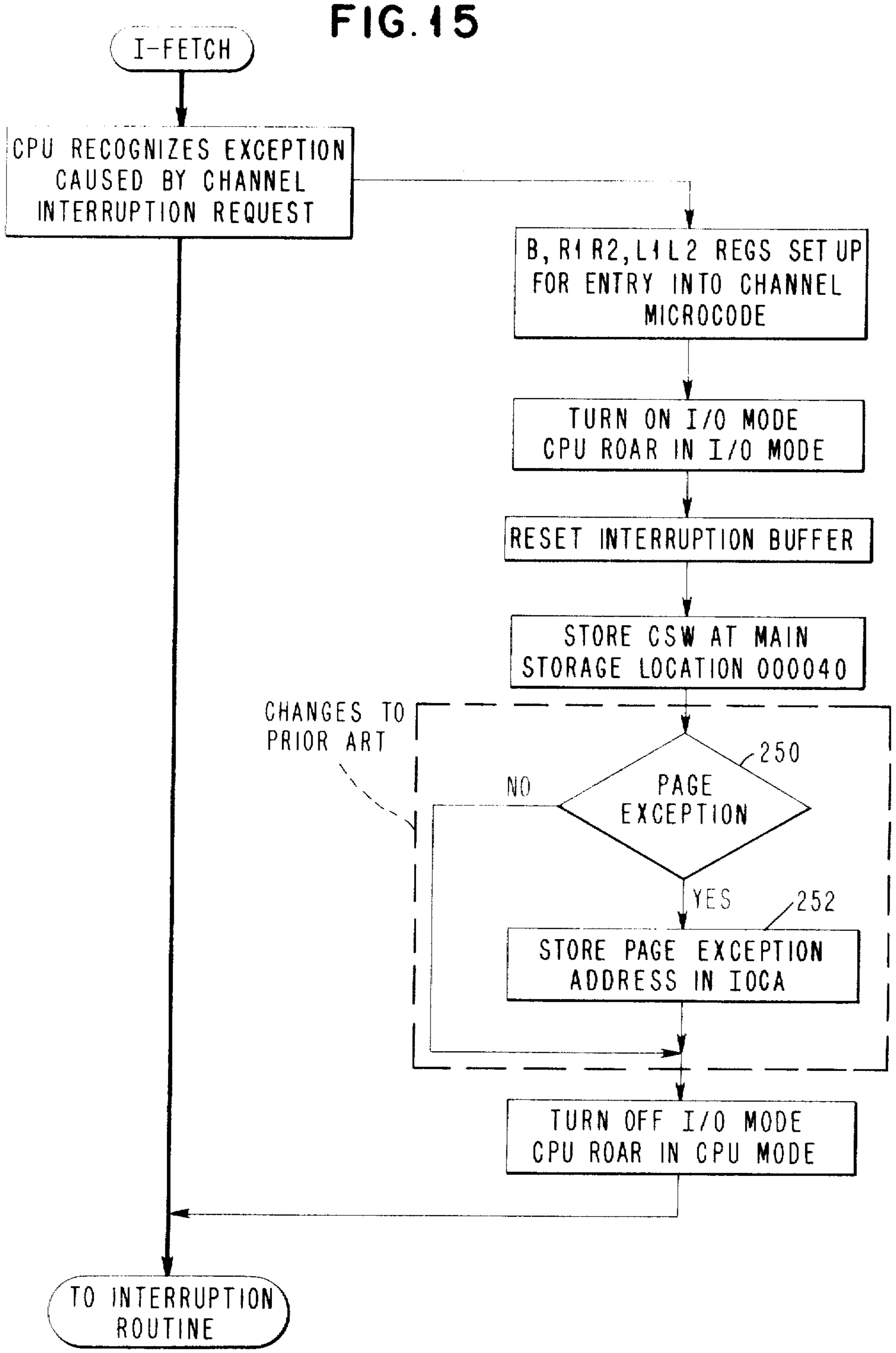
FIG. 15 is a flow diagram of a channel interruption request for a page exception.

Data transfer is ended when either the channel command work (CCW) count is satisfied or the device signals the end of the operation. The device sends terminal status, which the channel examines and uses, along with the unit control word information to make up a channel status word (CSW). When the CSW is formed to reflect the progress of the I/O operation at the subchannel, the virtual command address of the last CCW used in the operation is stored therein. The channel then initiates an interrupt request (block 198, FIG. 14) to signal the CPU that the I/O operation is ended and that the results are available. The channel becomes idle and the CPU honors the interrupt request when allowed to by the program status word (PSW). Referring to FIG. 15, if a page exception has occurred, (FIG. 17 block 372; FIG. 15 block 250), the page exception address is stored (FIG. 15 block 252) in the I/O control area 22 of FIG. 1. The CSW will have the paging fault bit 6 (24 of FIG. 1) turned on.

I/O Supervisor/Subchannel Interlocking

The I/O supervisor program for operating a data processing system described in this application is fully disclosed in co-pending application Ser. No. 211,913 — Channel Program Translation — L. E. Larson, filed on Dec. 27, 1971 and assigned to the assignee of the present invention. To accommodate a relocating channel of the type described in this application, it is necessary only to provide for the bypassing of the program translation routines for channel relocation devices, the routing of page fault program checks to error recovery programs and the addition of routines for inspecting the I/O summary bits.

For I/O devices which cannot tolerate paging faults, the I/O supervisor can fix every storage frame associated with the channel program. The channel apparatus will perform dynamic address translation as specified in the parameters passed at start I/O time.

I/O paging fault interruptions signal the I/O supervisor to make the requested pages available and then reinstate the channel program by resuming the start I/O instruction through the error recovery program. A new instruction, Restart I/O, can be used to increase the overall efficiency of the system, as described in copending application Ser. No. 367,281 — Suspension and Restart of Input/Output Operations — R. L. Cormier, filed on June 5, 1973 and assigned to the assignee of the present invention.

The paging supervisor requires additional means for inspecting the I/O summary bit (24 of FIG. 1 in the ISK), as well as the reference (R) and change (C) bits. The I/O summary bit, when on, indicates that there is at least one subchannel active in the pertinent storage frame. The control program inhibits the use of the frame for page replacement when its associated I/O summary bit is on.

When pages are replaced, the I/O summary bit must be inspected twice because the channel operation and the paging operation are asynchronous.

Figure 16:
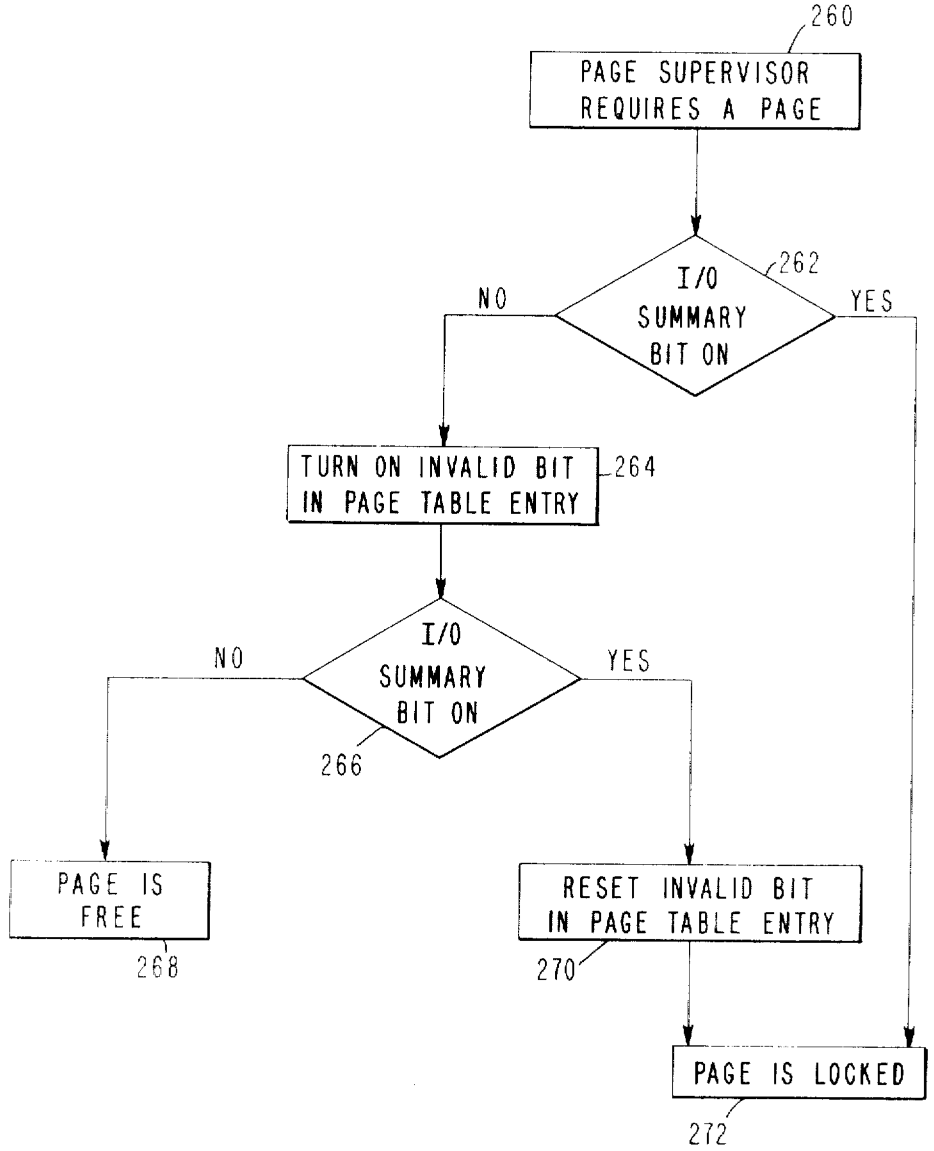
FIG. 16 is a flow diagram of the I/O supervisor/subchannel interlocking mechanism.

Referring to FIG. 16, when the paging supervisor requires a page, block 260, it inspects the I/O summary bit 262. If the I/O summary bit is off, this allows the control program to tentatively use the associated storage block as a page replacement by making the page invalid, block 264. The inspection which follows the invalidation must also find the I/O summary bit off block 266. In this case, the page is free 268 and the page replacement is complete.

If the I/O summary bit comes on between each inspection, the second inspection 266 will find the summary bit on. The control program then makes the page table entry valid by resetting the invalid bit in the page table entry block 270. This inhibits the use of the associated storage frame for page replacement 272.

Through the use of the interlocking provided by the I/O summary bit, the channel look-aside buffer is kept from interfering with the control program. Entries are locked into the channel look-aside buffer by the subchannels which find the associated page table entry invalid bits zero. As the subchannels no longer require these entries, they unlock them for possible use by the control program for page replacement thus eliminating the need for purging the channel look-aside buffer in order to free up these pages.

I/O page faults tend to be infrequent because I/O pages generally reside in real memory areas because prior to a start I/O, I/O pages usually have just recently been referenced and therefore have been moved to real memory locations. For example, during a write operation, the out buffers have just been filled and for read operation a GETMAIN has been issued prior to the start I/O thus providing in-buffer space. I/O page faults can be reduced to virtually zero by requiring the control programs to reference the buffer areas prior to issuing an execute channel program (EXCP) instruction.

Summary

An input/output data channel operates in conjunction with a virtual memory computer in a paging system. A channel operation is commenced with the execution of a start I/O instruction which transfers a channel address word (CAW) from a real area in memory to the channel. The CAW contains a virtual command address pointing to the beginning of the channel program. A channel look-aside buffer is provided which contains a virtual address stack to hold the active virtual data addresses and command addresses for each channel. The virtual command address in the CAW is presented to the channel look-aside buffer which translates the virtual command to a real memory address for accessing main storage.

The virtual command address is translated by a dynamic address translation function. The subchannels pick up and store from the I/O control area (IOCA) the following control information. A segment table origin word (STO); translation control bits (TCR) and a relocate mode bit which is bit 6 of the CAW and places the channel in the relocate mode. This bit, when off, allows the channel to operate in a non-relocate environment thus providing compatibility with current computers.

During the presentation of primary status, subchannels pass to the IOCA and the channel status work (CSW) all the required translation information needed by the control programs in support of paging faults and translation exceptions. This information includes the page exception address transferred to the IOCA and the turning on of paging fault bit 6 in the CSW.

A channel look-aside buffer is provided to accomplish the channel relocation function. The CLB holds the subchannel STO's, TCR's and the relocate mode bits passed at SIO time and the virtual data and virtual command addresses.

As virtual addresses are translated during the execution of a channel program, the real addresses are kept in the unit control words (UCW). The corresponding virtual addresses are kept in the channel look-aside buffer virtual address stack.

The channel look-aside buffer, in conjunction with the existing local store UCW, performs the following functions:

1. the CLB translates virtual addresses to real;
2. the CLB holds the virtual data and virtual command addresses on a subchannel basis in the virtual address stack;
3. the UCW store location 3 holds the segment origin on a subchannel basis;
4. the UCW store holds the translation control bits on a subchannel basis;
5. the UCW store holds the relocate mode bit on a subchannel basis;
6. the CLB provides interlocking of I/O references to memory frames by keeping track of I/O references to memory areas;
7. the CLB translates addresses only when required by providing a compare mechanism to see if an address needs to be translated, that is, a transfer-in-channel or a new data address within the same page need not be translated if it does not cross a page boundary;
8. the CLB passes the I/O summary bit to the CPU during the insert storage key instruction.

An I/O bit array contains a count mechanism for each frame which may be addressed by the channel.

Each time a memory frame is addressed by any one subchannel, the corresponding count is incremented. Similarly, when any of the channels are through with the memory frame the count is decremented. So long as there is an outstanding access to the memory frame, there is a non-zero count in the corresponding count position. This non-zero condition becomes the I/O summary bit and is transmitted to the CPU storage protect area to insure that the CPU does not try to page out the same memory page that the subchannels are using.

Once the channel program is started, data addresses are fetched sequentially by incrementing the data address by 8. If the data addresses do not cross a page boundary, it is not necessary to translate the virtual address to real for each data fetch. Therefore, the virtual and real high-order address portions are maintained in the virtual address stack and are combined with the byte portion of the new data address to provide the new real address.

The same holds true for command addresses which are used to fetch CCW's. The command address is also contained in the virtual address stack and is compared with the new virtual address. If the virtual has already been translated, it is not necessary to go through the translation process.

In a similar manner, transfer-in-channel command addresses contained in a CCW are checked before going through a translation which may not be necessary.

If a page fault does occur, the channel transfers a page fault address to the I/O control area and turns on a paging fault bit in the channel status word prior to initiating an I/O interruption.

At interruption time, the control program fixes pages and reinstates the start I/O instruction so that the channel program can be restarted.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An input/output data channel for use with a virtual memory computer including a CPU and a memory divided into memory frames comprising:

means for fetching a control word containing a virtual command address referring to a channel program;

means for translating the virtual command address in said control word to a real memory address for accessing said virtual memory;

means for storing said virtual and real addresses;

and registering means responsive to said real addresses for storing an indication that the real memory frame corresponding to said real memory address is being used by said channel to prevent the CPU from accessing the same memory frame.

2. The combination according to claim 1 including further means for fetching a control word stored at said real address, said control word containing a virtual data address referring to a memory location to or from which data are to be transferred, and means for translating the virtual data address to a real data address for accessing said memory location.

3. The combination according to claim 1 wherein said registering means includes an I/O bit array containing a count mechanism for each memory frame which may be addressed by a channel and means operative each time a particular memory frame is addressed by any one of a plurality of channels for incrementing the count corresponding to said particular memory frame.

4. The combination according to claim 3 including means operative at the end of a channel operation for decrementing said count.

5. An input/output data channel for use with a virtual memory computer including a CPU comprising:

means for fetching a channel address word (CAW) containing a virtual command address referring to the beginning of a channel program;

means for translating the virtual command address in said CAW to a real memory address for accessing said virtual memory;

means for translating virtual data addresses and command address contained in said channel program to real addresses for accessing said virtual memory;

means for storing said virtual and real addresses;

and registering means responsive to said real addresses for storing on indication that the real memory frame corresponding to said real memory address is being used by said channel to thereby prevent the CPU from paging out the same memory frame.

6. The combination according to claim 5 wherein said registering means includes an I/O bit array containing a count mechanism for each memory frame which may be addressed by a channel and means operative each time a particular memory frame is addressed by any one of a plurality of channels for incrementing the count corresponding to said particular memory frame.

7. The combination according to claim 6 including means operative at the end of a channel operation for decrementing said count.

8. In an input/output data channel for use with a virtual memory computer wherein a channel operation is commenced with the execution of an instruction which initiates a virtual channel program comprised of a sequence of control words containing virtual command or data addresses, means for translating said virtual channel program to real and for interlocking the operation of said channel with said computer, comprising:

means responsive to said instruction for transferring to said channel control information for referencing translation tables;

buffer storage means including means for holding active virtual data addresses and command addresses for said channel;

said buffer storage means also provided with means for storing said control information in conjunction with real data and real command address;

means operative in cooperation with said buffer storage means and said control information for translating virtual addresses to real addresses; and means for storing said virtual and real addresses in said buffer storage means, whereby as virtual addresses are translated during the execution of said channel program the real addresses are stored with the virtual addresses.

9. The combination according to claim 8 further comprising:

means operative in conjunction with said buffer storage means for fetching command and data addresses in accordance with said real addresses translated from said control words;

means for incrementing a fetched data address to point to the next successive data address;

registering means responsive to said real addresses for storing indications of I/O references to said memory including a count mechanism for each frame which may be addressed by each of a plurality of channels similar to said channel, wherein upon each reference to a memory frame the corresponding count is incremented and wherein said count is decremented by said channel when it releases said frame from use, whereby so long as there is an outstanding access to said memory frame, there is a non-zero count in the corresponding count position;

means responsive to said registering means for generating an I/O summary bit which indicates the non-zero condition of an addressed memory frame count;

and means for transmitting said bit to a storage protect area whereby interlocking is provided between memory users to prevent the other users from accessing the memory frame that said channel is using.

10. In an input/output data channel for use with a virtual memory computer operating with a paging supervisor wherein a channel operation is commenced with the execution of a start I/O instruction which transfers a channel address word (CAW) from a real area in memory to the channel, said CAW containing a virtual command address pointing to the beginning of a virtual channel program comprised of a sequence of channel command words (CCW's) containing virtual command or data addresses, means for translating said virtual channel program to real and for interlocking the operation of said channel with said computer, comprising:

means responsive to said start I/O instruction for transferring from an I/O control area to said channel a segment table origin word (STO) and translation control bits (TCR), said means including means for energizing a relocate mode bit in said CAW;

a channel look-aside buffer containing a virtual address stack for holding active virtual data address and command addresses for said channel;

said channel look-aside buffer provided with means for storing said STO, TCR, and relocate mode bits; and means operative in cooperation with said channel look-aside buffer for translating virtual addresses to real addresses, said means including means for storing said virtual addresses in said virtual address stack, whereby as virtual addresses are translated during the execution of said channel program the virtual addresses are stored in said virtual address stack.

11. The combination according to claim 10, further comprising:

means operative in conjunction with said channel look-aside buffer for fetching command and data addresses in accordance with addresses provided by said CAW and said channel command words, said means including means for sequentially incrementing said data addresses to point to successive data addresses;

means for fetching successive memory frames at locations specified by said successive data addresses;

registering means responsive to said real addresses for storing indications of I/O references to said memory including a count mechanism for each frame which may be addressed by each of a plurality of channels similar to said channel, wherein upon each reference to a memory frame the corresponding count is incremented and wherein said count is decremented by said channel when it releases said frame from use, whereby so long as there is an outstanding access to said memory frame, there is a non-zero count in the corresponding count position;

means responsive to said interlocking means for generating an I/O summary bit which indicates the non-zero condition of an addressed memory frame;

and means for transmitting said I/O summary bit to a storage protect area whereby interlocking is provided between memory users to prevent the other users from paging out said memory frame that said channel is using.

12. The combination according to claim 10 wherein said channel includes means for creating a channel status word (CSW) and, means in said CSW for indicating by a predetermined selectable state, that a paging fault has occurred, means for transferring to a control area a page fault address, and means for turning on a page fault indicator, whereby interfacing with said paging supervisor is provided.

* * * * *

PO-1050 (5/69)

UNITED STATES PATENT OFFICE
CERTIFICATE OF CORRECTION

Patent No. 3,839,706 Dated October 1, 1974

Inventor(s) Erik Borchsenius and Donald M. Ludlow

It is certified that error appears in the above-identified patent and that said Letters Patent are hereby corrected as shown below:

Insert after Erik Borchsenius under heading Inventors --Donald M. Ludlow--. Column 2, line 59, the word "stroqa " should read --storage--.
should read --overall--; Column 3, line 19, the word "in" should read --is--. Column 5, line 34, the word "described" should read --describes--. Column 7, line 35, the word "Detail" should read --Detailed--. Column 12, line 16, the words "in is" should read --is in--.

Column 16, line 57, the word "address" should read --addresses--. Column 18, line 47, after the word "means" insert --and--; Column 18, line 48, delete the word "means".

Signed and sealed this 11th day of March 1975.

(SEAL)
Attest:

RUTH C. MASON
Attesting Officer

C. MARSHALL DANN
Commissioner of Patents
and Trademarks 603-2721-0